United States Patent Office 3,265,701
Patented August 9, 1966

1

3,265,701
FLUORENE-9-CARBOXYLIC ACID ESTERS
OF HYDROXYALKYL AZASPIRANES
Meier E. Freed, Philadelphia, Pa., and Leonard M. Rice, Minneapolis, Minn., assignors to American Home Products Corporation, New York, N.Y., a corporation of Delaware
No Drawing. Filed July 10, 1963, Ser. No. 294,163
5 Claims. (Cl. 260—294.3)

The present invention relates to certain novel chemical compounds useful as central nervous system moderators. More particularly it is directed to a novel class of fluorene-9-carboxylic acid esters of hydroxyalkyl azaspiranes which exert hypotensive or blood pressure reducing and/or antimorphine effects in mammals.

The invention also involves methods for the manufacture and use of these esters and certain intermediates obtained in the preparation of the said novel materials.

The invention in its primary product aspect therefore concerns a series of novel fluorene-9-carboxylic acid esters of hydroxyalkyl azaspiranes which may be generally represented by the following structural formula:

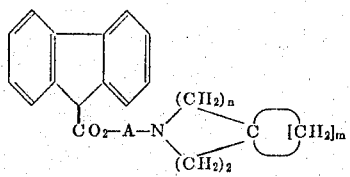

and the pharmaceutically acceptable acid addition salts thereof wherein A represents a polymethylene radical, preferably a dimethylene or trimethylene radical, which may in some cases be lower alkyl substituted; $n$ is either 1 or 2 while $m$ is a positive integer extending from 4 to 7.

The compounds of our invention may be prepared as either the base form as shown above or the neutral acid addition salt form obtained by reaction of the base with a pharmaceutically acceptable non-toxic acid which may be either organic or inorganic. Some typical organic acids which may be used are acetic, maleic, and citric to name a few for purposes of illustration, although any non-toxic one may be employed. Suitable inorganic acids are typically hydrochloric, sulfuric, phosphoric, to cite a few of the better known ones. Also included within the broad scope of the novel compounds which comprise the prime product aspect of the invention are the quaternary salts of the aforesaid bases such as the methohalides and methosulfates obtained by treatment of the base with reagents such as methyl/iodide and methyl/sulfate.

The compounds of the present invention may be prepared by more than one method of synthesis. However, we prefer to employ the method outlined in the following illustrative reaction scheme for the preparation of the compound 2-(3-azaspiro[5.5]undec-3-yl)ethyl-9-fluorene carboxylate:

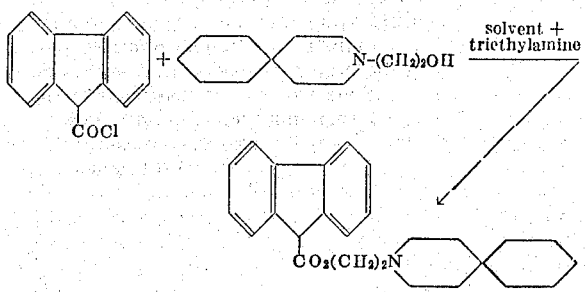

In the above reaction the known reagent fluorene-9-carbonyl chloride in a suitable organic reaction solvent such as ether is added to a mixture of a suitable hydroxyalkyl azaspirane and trialkylamine, in this particular case the azaspirane being 3-[2-hydroxyethyl]-3-azaspiro [5.5]undecane and the amine being triethylamine, both taken up in the same reaction solvent as the other reactant. It should be understood that any one of a series of similar azaspiranes may be employed in place of the one disclosed in the above reaction. The approximate scope of the azaspirane reactant may be easily observed from the scope of the resulting azaspirane moiety of the reaction product obtained. After combination of the reactants the mixture is refluxed for from about 4 hours to overnight, the reaction temperature being limited by the refluxing temperature of the organic reaction solvent employed. When the reaction has gone to completion the crude product obtained is purified by conventional techniques such as saline wash, ether extraction, and the like to obtain the product of the invention.

Alternatively one may prepare the novel compounds of the invention by a somewhat different method as illustrated by the preparation of the same member of the series as before, i.e., 2-(3-azaspiro[5.5]undec-3-yl)ethyl-9-fluorene carboxylate:

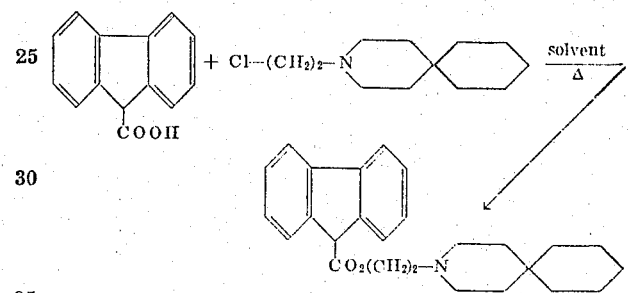

In the above preparation we employ the fluorene carboxylic acid as a starting material rather than the acid chloride employed in reaction A. Likewise we employ the chloro substituted analog of the 3-(2-hydroxyethyl)-3-azaspiro[5.5]undecane reactant of reaction A to obtain the common reaction product after heating overnight at reflux with both reactants present in an organic solvent such as isopropanol.

Although in the above preparation A the organic reaction solvent ether is disclosed, it must be understood that this solvent is merely exemplary of a number of suitable organic solvents such as benzene, acetone, hexane, toluene, methylene dichloride and the like which may be employed in the reaction. In reaction B however a polar solvent generally is desired to promote the reaction. An example of such solvents frequently used are organic alcohols such as propanol or isopropanol, acetonitrile, and the like.

In a similar manner the use of triethylamine in the preparation A above is not intended to be critical since other suitable amines which may be employed are diethylene diamine, trimethylamine, pyridine and the like, as well as other mild bases such as alkali metal carbonates like sodium or potassium carbonate.

For therapeutic purposes the bases of general Formula I may be employed as such or in the form of their acid addition salts, it being understood that only those such salts should in practice be employed as contain anions that are relatively innocuous to the animal organism when used in therapeutic doses, so that the beneficial physiological properties inherent in the parent compound are not vitiated by side effects ascribable to those anions. These salts may be made from the bases of general Formula I by the methods heretofore used in the art for preparing acid addition salts. For example, the acid salts may be made by mixing the required base with an equivalent quantity of a non-toxic acid in a solvent and isolating the resultant salt by filtration after if necessary part or all of the solvent has been removed.

The compounds of the present invention can be prepared and administered to mammals, i.e., humans and animals, in a wide variety of oral and parenteral dosage forms, singly or in combination with other coacting compounds. They can if desired be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or vehicles such as non-toxic alcohols, glycerine or the like, may be thus used.

When so administered by oral or intraperitoneal routes in dosages of from 20 to 200 mg./kg. of body weight to hypertensive laboratory mammals, certain of the compounds of the invention will moderate and alleviate this condition. Other members are noted to be active stimulants and antidepressants. Moreover, their utility, in addition to the specific areas noted, also extends to the general area of veterinary medicine as well as experimental pharmacology, where they are useful as agents in testing and evaluation of various central nervous system moderators.

The following examples will serve to further illustrate the invention in its various product and process aspects. Since the scope of the invention may only be determined by the definition of the invention expressed in the several appended claims, it must be understood that these several examples are purely exemplary of the invention and are not intended to limit its concept in any manner.

EXAMPLE 1

*2-(3-azaspiro[5.5]undec-3-yl)ethyl-9-fluorene carboxylate*

Add a solution of fluorene-9-carbonyl chloride (4.6 g., 0.02 mole) in 50 ml. of ether, to a stirred solution of 3-[2-hydroxyethyl]-3-azaspiro[5.5]undecane (3.9 g., 0.02 mole) and triethylamine (3 g., 0.03 mole) in 75 ml. of ether. After addition is complete stir the mixture and reflux for 4 hours. After cooling, filter off the precipitate and wash the filtrate 3 times with saline. Dry the ether layer (sodium sulfate), filter, and distill the ether. Redissolve the residue in 75 ml. of acetone and acidify with alcoholic hydrogen chloride. Leave standing to allow the product to crystallize, collect, wash with acetone and with ether, and dry; M.P. 168–169°.

*Analysis.*—Calcd. for $C_{26}H_{32}ClNO_2$: C, 73.30; H, 7.57; N, 3.29; Cl, 8.32. Found: C, 73.48; H, 7.61; N, 3.07; Cl, 8.34.

EXAMPLE 2

*3-(3-azaspiro[5.5]undec-3-yl)propyl-9-fluorene carboxylate*

Add a solution of fluorene-9-carbonyl chloride (4.6 g., 0.02 mole) in 50 ml. of dichloromethane to a solution of 3-(3-hydroxypropyl) - 3 - azaspiro[5.5]undecane (4.2 g., 0.02 mole) and triethylamine (2 g., 0.02 mole) in 175 ml. of dichloromethane. After 12 hours at room temperature, with stirring, reflux the mixture for 2 hours. Cool the reaction mixture and remove the solvent under vacuum. Take up the residue in ether and water. Wash the organic layer with saline, dry, and filter. Treat the filtrate with dry hydrogen chloride. Collect the precipitate on a funnel, wash with acetone-ether, and dry; M.P. 183–4°.

*Analysis.*—Calcd. for $C_{27}H_{34}ClNO_2$: C, 73.75; H, 7.79; Cl, 8.06; N, 3.18. Found: C, 73.81; H, 7.82; Cl, 8.15; N, 3.30.

EXAMPLE 3

*2-(2-azaspiro[4.7]dodec-2-yl)ethyl fluorene-9-carboxylate*

This compound may be prepared by the reaction of 9-fluorene-carbonyl chloride (4.6 g., 0.02 mole) with 2-(2-hydroxyethyl)-2-azaspiro[4.7]dodecane (4.2 g., 0.02 mole) in the manner described in preceding Example 2.

EXAMPLE 4

*2-(2-azaspiro[4.4]non-2-yl)ethyl fluorene-9-carboxylate*

This compound may be prepared by the reaction of 9-fluorene-carbonyl chloride (4.6 g., 0.02 mole) with 2-(2-hydroxyethyl) - 2 - azaspiro[4.4]nonane (4.2 g., 0.02 mole) in the manner described in preceding Example 2.

EXAMPLE 5

*2-(2-azaspiro[4.5]dec-2-yl)ethyl fluorene-9-carboxylate*

This compound may be prepared by the reaction of 9-fluorene carbonyl chloride (0.02 mole) with 2-(2-hydroxyethyl) - 2 - azaspiro[4.5]decane (0.02 mole) in the manner described in preceding Example 2.

EXAMPLE 6

*2-(3-azaspiro[5.5]undec-3-yl)isopropyl-9-fluorene carboxylate*

By the substitution as the azaspiro reactant the compound 3-(2-chloropropyl)-3-azaspiro[5.5]undecane in the general procedure B which involves reaction with a quantity of fluorene carboxylic acid in the presence of a suitable organic solvent such as isopropanol at reflux temperatures one will obtain the product of this example.

EXAMPLE 7

*3-(3-hydroxypropyl)-3-azaspiro[5.5]undecane*

A. 3-(3-HYDROXYLPROPYL)-3-AZASPIRO[5.5]UNDECANE-2,4-DIONE

Heat a mixture of 3-hydroxypropylamine (1 mole) and cyclohexane diacetic anhydride (1 mole) under reflux for 2 hours in 25 ml. of water. Evaporate the solution to a small volume and place in a distillation flask. Heat the mixture in an oil bath to 180–200° till evolution of water ceases. Distill the product at 159°–160° at 0.025 mm. of mercury.

*Analysis.*—Calcd. for $C_{13}H_{21}NO_3$: C, 65.24; H, 8.85; N, 6.02. Found: C, 65.16; H, 8.85; N, 5.85.

B. 3-(3-HYDROXYPROPYL)-3-AZASPIRO[5.5]UNDECANE

Add slowly a solution of 3-(3-hydroxypropyl)-3-azaspiro[5.5]undecane-2,4-dione (12 gm., 0.05 mole) in anhydrous ether to a stirring and refluxing suspension of lithium aluminum hydride (2.8 gms., 0.1 mole) in anhydrous ether (250 ml.). Reflux 12 hours, cool, decompose by the careful addition of water and filter. Concentrate the filtrate and distill the product. B.P. 92–96° at 0.075 mm.

*Analysis.*—Calcd. for $C_{13}H_{25}NO$: C=73.88; H, 11.92; N, 6.63. Found: C=73.65; H, 11.82; N, 6.74.

In a similar manner like hydroxyalkyl and haloalkyl substituted 3-azaspiro[5.5]undecanes may be prepared for use by selection of a suitably substituted amine in part A for reaction with the proper cycloalkyl acid anhydride to obtain the correct dione which is transformed to the final product in the manner indicated. In such fashion a compound such as 3-(2-hydroxyethyl)-3-azaspiro[5.5]undecane, 3-(3-hydroxypropyl)-3-azaspiro[5.5]undecane, or 3-(2-chloroethyl)-3-azaspiro[5.5]undecane, or 3-[3-chloropropyl]-3-azaspiro[5.5]undecane may be obtained either initially or by simple halogenation in some cases involving the latter compounds. The analogous none, decane and dodecane starting compounds may be prepared in like manner.

We claim:

1. 2-(3-azaspiro[5.5]undec-3-yl)ethyl-9-fluorene carboxylate.
2. 3-(3-azaspiro[5.5]undec-3-yl)propyl-9-fluorene carboxylate.
3. A compound of the formula:

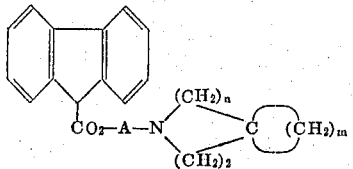

and the pharmaceutically acceptable acid addition salts thereof, wherein A is an alkylene group having from 2 to 4 carbon atoms; $n$ is an integer from 1 to 2; and $m$ is an integer from 4 to 7.

4. A compound of the formula

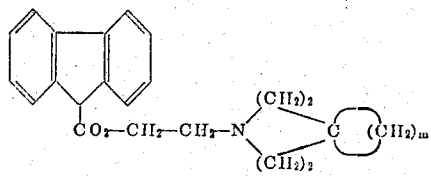

and the pharmaceutically acceptable acid addition salts thereof, wherein $m$ is an integer from 4 to 7.

5. A compound of the formula

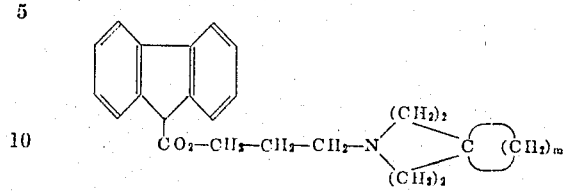

and the pharmaceutically acceptable acid addition salts thereof, wherein $m$ is an integer from 4 to 7.

References Cited by the Examiner
UNITED STATES PATENTS
2,650,230  8/1953  Cusic _____ 260—294.3

ALEX MAZEL, *Primary Examiner.*
HENRY R. JILES, *Examiner.*
JOSE TOVAR, *Assistant Examiner.*